Figure 4:
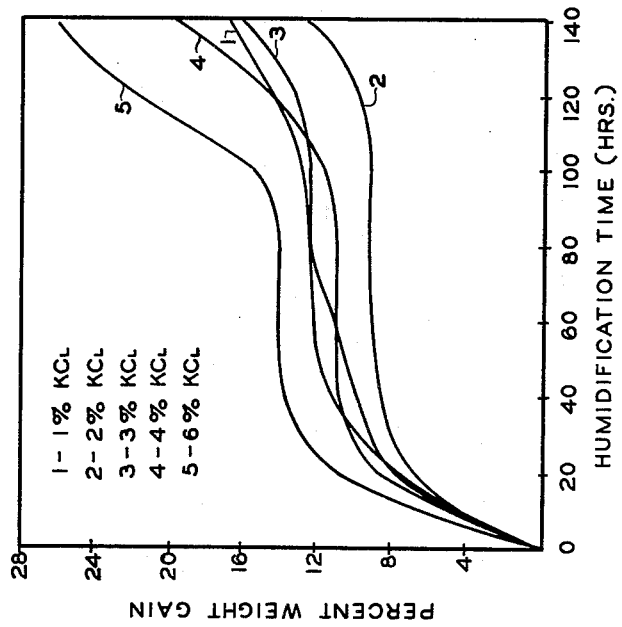

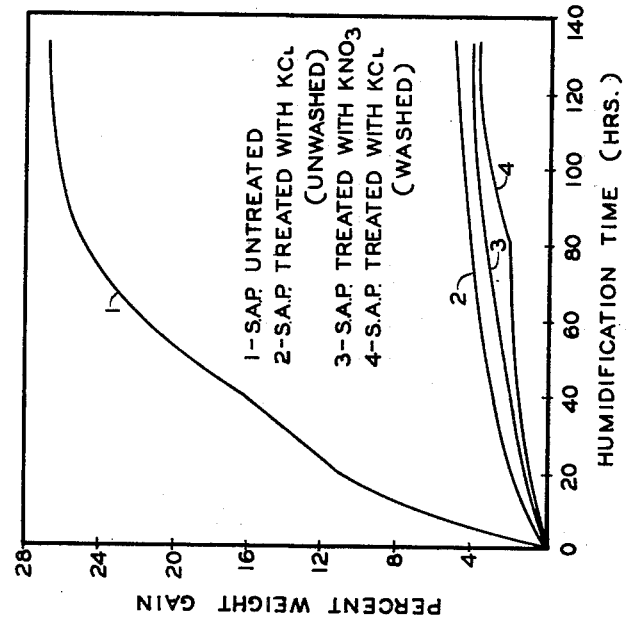
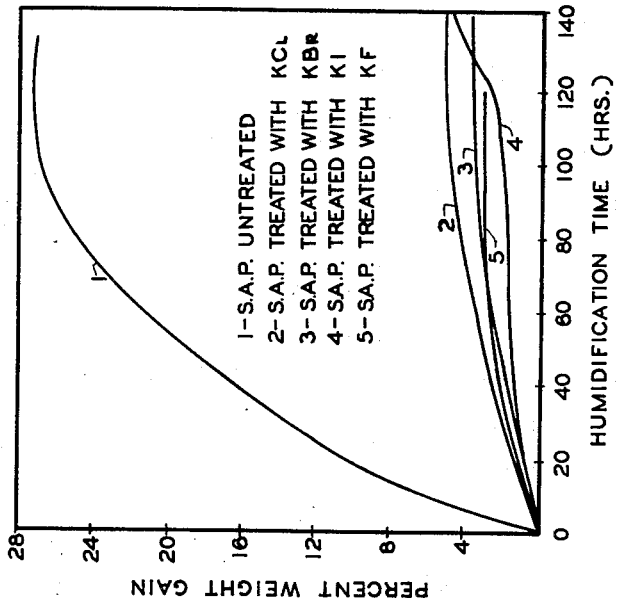

HUMIDIFICATION TESTS AT 75% R.H. AND 35° C. (DRY MIXES OF S.A.P. AND KCL.)

HUMIDIFICATION TESTS AT 75% R.H. AND 35°C. (SODIUM ALUMINUM PHOSPHATE SLURRIED IN 0.405M AQUEOUS SALT SOLUTION)

INVENTORS
JULIAN E. BLANCH
FRED McCOLLOUGH, JR.
BY
THEIR AGENT

United States Patent Office 3,205,073
Patented Sept. 7, 1965

3,205,073
NON-HYDROSCOPIC POTASSIUM MODIFIED SODIUM ALUMINUM ACID PHOSPHATE AND METHOD OF PRODUCING SAME
Julian E. Blanch, Tinley Park, and Fred McCollough, Jr., Chicago Heights, Ill., assignors to Stauffer Chemical Company, New York, N.Y., a corporation of Delaware
Filed Apr. 27, 1964, Ser. No. 364,337
10 Claims. (Cl. 99—95)

This application is a continuation in part of our copending U.S. application, Serial No. 148,332, filed October 30, 1961 and now abandoned.

The present invention is directed to novel non-hygroscopic compounds and compositions, their method of preparation and use in dry prepared cake and pancake mixes.

Sodium aluminum phosphate (herein alternatively denoted SAP) is a well-recognized and approved food additive used, e.g., as a leavening acid in baked products, as a melt-controlling additive in cheese, and as a meat binding agent. Today SAP has its major use in the baking art, being utilized in biscuit mixes, pancake mixes, waffle mixes, cake mixes, doughnut mixes, muffin mixes, canned biscuits, self-rising flours and frozen rolls. Because of its compatibility with the more recently developed, highly efficient, lactylated mono- and diglyceride or propylene glycol monostearate type shortenings (presently being used in cakes), it has become a standard leavening acid for cake baking.

Sodium aluminum phosphate is, however, an inherently hygroscopic material which will absorb a large quantity of atmospheric moisture, usually about 28–29% by weight. Originally produced, SAP is a dry, white crystalline product. If permitted to stand exposed in a hot, humid atmosphere it rapidly absorbs moisture, first forming water droplets or caking at the surface, then becoming what may be termed a viscous semi-fluid. Commercially, this phenomenon is minimized somewhat by the use of sealed, airtight containers. Nevertheless, the precautions required are time consuming and expensive, and in practical applications, the problem remains a significant diadvantage.

We have now found that if the original SAP molecule is modified by the introduction of potassium, a product results which has an extremely low level of hygroscopicity and which will remain substantially uncaked after long periods of exposure to humid, hot atmospheric conditions. As will be more fully explained hereafter, potassium atoms replace hydrogen atoms in the crystalline lattice of SAP. Moreover, the potassium compound used must be one capable of ionization. Addition of the potassium may be accomplished either during manufacture of the SAP, even before the SAP-forming reaction, or as a final step after preparation. Surprisingly, the preferred potassium modified sodium aluminum phosphate of the invention has all of the desirable reactivity, taste, and other baking characteristics of the prior art SAP plus the advantage of greatly decreased hygroscopicity.

As used herein, the term "sodium aluminum phosphate" is intended to describe a crystalline compound of the empirical formula $NaAl_3H_{14}(PO_4)_8 \cdot 4H_2O$. This compound, its method of manufacture and utility in the baking art are set forth in U.S. Patents 2,550,490 and 2,550,491. Other terms by which this compound is known include sodium aluminum phosphate, tetrahydrate; regular sodium aluminum phosphate; and sodium aluminum acid phosphate. Often the compound is represented symbolically as NALP, SALP, SAP·$H_2O$, SAP·$4H_2O$, or (like herein) SAP.

Although we do not wish to be bound to any specific theory, there is evidence that the present invention involves ion exchange whereby acidic hydrogen atoms of the SAP molecule are replaced by potassium atoms to form a non-hygroscopic sodium potassium aluminum phosphate. In support of the postulated ion exchange mechanism, it has been found that a KCl-treated SAP can be washed completely free of Cl ion. Obviously, to maintain electrical neutrality, some positive ion must be removed. That the $Na^+$ is not exchanged for $K^+$ is proved by the fact that when treating SAP with a dilute potassium salt solution the pH of the solution decreases markedly without appreciable solubilization of SAP. Further, an exchange between $Na^+$ and $K^+$ would not explain the significant decrease in hygroscopicity of the resultant product, since it is known that potassium aluminum phosphate, $$KAl_3H_{14}(PO_4)_8 \cdot 4H_2O$$

is nearly as hygroscopic as sodium aluminum phosphate.

More acidic compositions, those containing only small amounts of potassium, are to be preferred. This is essential if the compositions are to function, for example, as baking acids. Obviously, the more acidic the composition the more effective its reaction with sodium bicarbonate in baked goods. To this end we have discovered that preferred, non-hygroscopic compounds and compositions may be prepared in which only a very minor amount of the acidic hydrogen is replaced by potassium. The "neutralizing value" of such potassium-treated SAP, which correlates with total acidity, will be essentially the same as untreated SAP baking acid.

Significantly, we have found that it appears possible to concentrate the potassium at or near the surface of the crystalline particles. For example, it has been discovered that preformed SAP crystals will normally pick up only about 0.1 to 2.0 percent potassium when slurried in a potassium-containing solution. Under ordinary treating conditions, the continued exposure to potassium ion in solution results in little or no additional increase in the potassium content of the SAP unless the particles are milled and again treated with the potassium-containing solution.

Where used herein, without qualification, the term "non-hygroscopic," as it is applied to the novel compositions of the invention, is intended to define a potassium modified form of the normally hygroscopic SAP which will not increase in weight by more than about 20%, preferably not more than about 10%, of its original weight during continued exposure at 35° C. and 75% relative humidity for 140 hours. By comparison, the prior art unmodified material increases in weight by about 28–29% under the same conditions of temperature and humidity.

The manufacture of SAP practiced heretofore usually consisted of reacting a reactive aluminum compound such as the metal itself or its oxide or hydroxide, etc., with a stoichiometric or excess amount of phosphoric acid, adding sodium hydroxide or carbonate in an atomic ratio of one sodium to three aluminum, and concentrating the resulting viscous liquor until crystallization occurred. As water was removed during the concentration step, the liquor gradually became more viscous until finely divided particles of $NaAl_3H_{14}(PO_4)_8 \cdot 4H_2O$ were formed.

By the present method, the starting materials, with the exception of potassium, are the same as heretofore utilized in the manufacture of SAP. Moreover, the present method comprises the essential processing operations, e.g., reaction of sodium and aluminum compounds with phosphoric acid and concentration of the resulting liquor, as practiced in the prior art manufacture of SAP. Succinctly stated, the invention adds to the prior art method an improving step, which comprises the addition of potassium-containing compounds.

The potassium compound may be added at any stage during manufacture or after crystallization. Thus a potassium compound may be added to the phosphoric acid together with the sodium and aluminum ingredients or, in the alternative, after addition of the sodium and aluminum ingredients. Another method is to add potassium ion from a solution by spraying said solution on an agitated or thin static bed of SAP crystals formed by the prior art method. Spraying is preferably accomplished during crystallization while the SAP crystals are still moist, but may also be carried out after the crystals are fully dried. When it is desirable to introduce large amounts of potassium ion into the original SAP molecules, addition of the potassium is usually accomplished before crystallization. The spraying technique is more applicable to the inclusion of small amounts of potassium at the surface of preformed SAP particles. Another technique which has been found satisfactory is to physically admix a substantially dry potassium compound with preformed SAP particles. Generally, the potassium compound may be dissolved, if readily soluble, and added from solution, or it may be added in the dry form during manufacture or by physical admixture to dry SAP (whether soluble or insoluble).

Potassium has been found to be readily reactive with SAP (and the viscous liquid phase present before crystallization) without any necessity for controlling the temperature. However, intimate contact between the potassium ion and the reactive SAP molecule is necessary as is the presence of an ionizing medium, such as water. In-process addition of a potassium compound during the manufacture of SAP will generally not require any extra mixing (over that normally provided) to achieve suitable dispersion of the potassium ion. On the other hand, dry physical admixtures require vigorous mixing. These requirements will be more fully understood from the specific examples given hereinafter.

The apparatus which may be utilized in the process of the invention comprises the continuous and batch apparatus used heretofore in the manufacture of SAP. For example, the starting material may be reacted and kneaded in a kettle-type reactor fitted with a slow-speed paddle agitator. On a continuous scale, a horizontal blade mixer may be used. When it is desired to introduce potassium ion into preformed SAP, a second unit may be used for after-treatment. Thus SAP may be sprayed with a potassium-containing solution while maintained in a dense fluidized bed, or in a mildly agitated bed such as produced in a rotary kiln, conveyor or dryer. As an alternative, the SAP may be slurried in a solution and then dried in any conventional drying unit, including the aforementioned.

The potassium ion may be supplied from any potassium compound having an organic or inorganic anion and which will ionize in either organic or inorganic solvents to furnish a free and available potassium cation. Among those with inorganic anions, the potassium salts such as potassium chloride, potassium bromide, potassium iodide, potassium fluoride, tri-potassium orthophosphate, potassium nitrate, potassium hydroxide, potassium carbonate, potassium sulfate, and monobasic potassium phosphate are to be preferred. The suitable organic-anion compounds include, for example, potassium tartrate, potassium acid tartrate, potassium acid phthalate and potassium acetate.

The amount of potassium required to produce non-hygroscopic compounds and compositions by the present invention is largely influenced by the method of addition. In this regard it is believed that the potassium may situate at the surface of SAP particles, or distribute throughout the particles, depending upon the particular method of preparation. For example, a substantially non-hygroscopic compound may be formed by the inclusion of as little as 0.1% by weight chemically bonded potassium, providing the potassium is added during the late stages of crystallization or thereafter. This method of addition obviously concentrates a large percentage of the bonded potassium at the outer surface of the particles. By this method a baking acid may be prepared in which at least about 0.1% and not more than about 2.0% by weight potassium, based on the weight of the final product, is chemically bonded to SAP. A preferred baking acid contains between 0.3% and 1.0% by weight potassium. Larger quantities of potassium are generally required to achieve equivalent non-hygroscopicity where the potassium is added to the liquid phase before crystallization. As much as 10.0% by weight potassium may be used to effect a satisfactory hygroscopicity by this latter method.

Desirable acid-reacting compositions, suitable for use as baking acids, are prepared by intimately mixing unreacted SAP with a potassium compound, preferably an edible potassium salt. A preferred dry mix baking acid comprises from 0.5% to 4.0% by weight of potassium compound. Where desirable, a large excess of potassium compound, more than that which will effectively react with SAP, and up to about 20.0 by weight of the dry mix composition, may be added. Furthermore, it is often desirable to use excess potassium by the other methods of addition described herein. From a consideration of the chemical formula of SAP (containing fourteen acidic hydrogen atoms) it can be readily seen that the calculated theoretical limit of chemically bound potassium cannot exceed about 37% of the total weight of the potassium modified sodium aluminum phosphate, based on a one for one exchange of $K^+$ for $H^+$. When manufactured for use as a leavening agent, the potassium modified sodium aluminum phosphate of the present invention will normally not contain more than about 10% by weight of potassium as chemically bound potassium atoms.

The preferred, non-hygroscopic baking acids of the invention, those comprising at least about 0.3% and not more than about 1.0% potassium, based on the total weight of the product, will normally have neutralizing values within the range of 96 to 103. The prior art SAP typically has neutralizing values of from about 99 to 103. The "neutralizing value" is a standard quantitative measurement of the acidic strength of a baking acid and is measured as the parts by weight of bicarbonate of soda which will be neutralized by exactly 100 parts by weight of the baking acid.

The following specific examples are illustrative of the preparation and properties of compositions of this invention, and should not be construed as unduly limiting the invention.

EXAMPLE 1

One gram (0.0135 mole) of KCl was dissolved in 50 to 75 ml. of a 50% water–50% alcohol solution (volume percentages) in a 100 ml. volumetric flask. After the KCl dissolved completely, additional solution was added to bring the volume up to 100 ml. The resulting solution was transferred to a 250 ml. beaker. Thirty grams of SAP was then added to the beaker and the slurry stirred for one minute. The slurry was filtered on a Buchner funnel and sucked as dry as possible with the aid of vacuum. The SAP filter cake was not washed. The filter cake was then transferred to a 250 ml. suction flask and placed under a vacuum of 10–15 mm. Hg overnight for drying. The same exact procedure, using the same quantities of salt (on a mole basis) was employed to treat SAP with KBr, KI, and KF.

Five grams of each of the SAP samples prepared by the above-described procedure, plus one control sample of untreated SAP, were weighed into previously weighed aluminum dishes having 2 inch diameters and ½ inch depth. The sample dishes were tapped lightly to insure an even distribution of material and then placed in a humidor maintained at 75% R.H. and 35° C. Humidity was maintained by a saturated NaCl solution. Temperature control was ±1° C. The dishes were removed periodically, weighed, and the percentage weight gain calculated. Visual inspections were also made. After about ten hours in the humidor, the untreated SAP began to feel sticky to the touch, at which time it had absorbed about 7% of its original weight of water. After 90 hours in the humidor, the untreated sample had absorbed sufficient water to become virtually a viscous liquid. All of the potassium halide-treated samples remained essentially dry to the touch, picking up 1% or less of water in the first 10 hours, and not more than about 5% water during the entire period of humidification (140 hours).

FIGURE 1 sets forth graphically the results of Example 1. Percentage weight gain, or said another way, the percentage increase in weights of the test samples based on their original weights, is plotted against time of retention under the humidifying conditions of 75% R.H. and 35° C. Graphically, the differences in hygroscopicity between untreated SAP and the potassium modified compounds are quickly seen. Whereas untreated material absorbs moistures at a very rapid initial rate, reaching equilibrium in the neighborhood of 28% weight gain, the treated material slowly increases in weight, and reaches equilibrium at a much lower point.

EXAMPLE 2

Samples of KCl-treated SAP and KNO$_3$-treated SAP were prepared according to the procedure and proportions set forth in Example 1. After being dried with the aid of vacuum, a KCl-treated sample was washed thoroughly with a 50% ethanol–50% water solution to remove any possible excess chloride ion, and again dried under vacuum. The test samples were then placed in a humidor and subjected to the same conditions of humidification (75% R.H. at 35° C.) set forth in Example 1. Results showed that the washed, KCl-treated sample had approximately as good, or possibly a little better, resistance to moisture pick-up than unwashed, KCl-treated SAP.

The data obtained from the humidification tests of Example 2 are plotted in FIGURE 2, which is drawn to the same scale and values as FIGURE 1, supra. It can be readily observed that there is no significant difference in over-all effect between the nitrate and the halides, again confirming the belief that the potassium ion is controlling and that the anion size or type has little or no effect on the resultant hygroscopicity.

EXAMPLE 3

Figure 3:
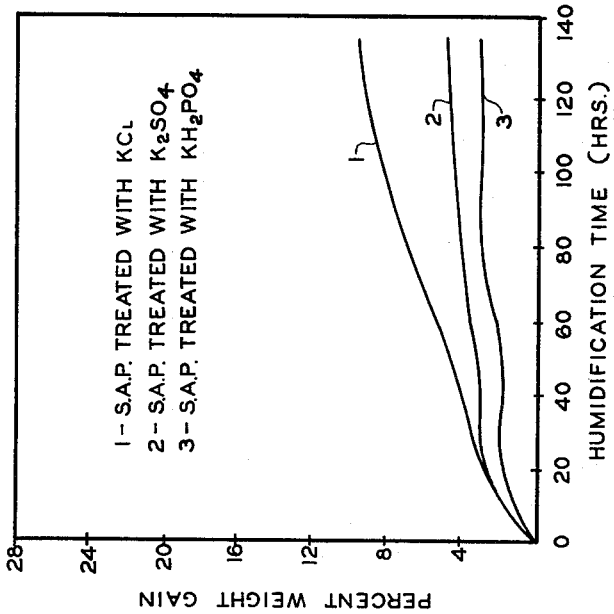

Using the procedure set forth in Example 1, three samples consisting of 30 grams each of SAP were slurried for one minute in completely aqueous solutions of either 0.405 M K$_2$SO$_4$, KH$_2$PO$_4$, or KCl. Five gram samples treated in the above-mentioned solutions were exposed for 132 hours at 75% R.H. and 35° C., during which time periodically the samples were weighed and percentage weight gain calculated and recorded. In spite of the higher concentration of KCl solution used in the present experiments, as compared to the solutions of Example 1, it may be noted that the KCl-treated SAP absorbed above 4–5% more moisture. Nevertheless, the improvement in hygroscopicity was very marked when compared to untreated SAP, untreated SAP picking up about 28% of its weight of water while SAP treated with aqueous KCl picked up only 9% after 132 hours at 75% R.H. and 35° C. On the other hand, the SAP treated with 0.405 M aqueous solutions of K$_2$SO$_4$ and KH$_2$PO$_4$ were found to be about as low in hygroscopicity as the SAP treated with potassium halides in water-alcohol solutions. These data are given more specifically in FIGURE 3.

EXAMPLE 4

To five, fifty-gram samples of SAP was added either 0.5, 1.0, 1.5, 2.0, or 3.0 grams of dry, particulate KCl previously milled and screened to —400 mesh. The samples were placed in individual one-liter round bottom flasks together with 200 grams of glass beads. The flasks were then maintained under vacuum and rotated for one hour in a horizontal position by means of motors. A full vacuum was applied (1–2 mm. Hg) to yield good tumbling action. After mixing, 5 grams of each of the 5 aforementioned samples were placed on individual sample dishes and exposed to humidification tests according to the procedure outlined in Example 1. The results are plotted in FIGURE 4. It may be seen that mechanical addition of potassium salts to SAP retarded its rate of moisture absorption but did not give the extended protection resulting when slurrying the SAP in a solution of the salt. Initially, the mixture absorbed water at the same rate as untreated SAP. After 24 hours of exposure in the humidor, absorption leveled off and for the next 100 hours remained substantially unchanged. After about 124 hours the samples again absorbed moisture at a fast rate. Examination during humidification showed that the samples became progressively clammy, then gummy. It may also be observed that there is a lack of correlation between the percentage KCl in the dry mix and the rate of moisture pickup. From the present experiment, it seems likely that the dry mixed potassium salt does not ionize or attain sufficient ion mobility until a significant percentage of water is absorbed at the surface of the SAP particles, at which time a delayed action ion exchange takes place.

EXAMPLE 5

Three samples of SAP, each weighing 30 grams, were treated, according to the procedure described in Example 1 with 100 ml. of 0.135 M, 0.067 M and 0.033 M KCl in 50% water–50% ethanol solutions. After drying, each treated sample was washed thoroughly with a 50% water–50% ethanol solution to remove excess chloride ion, and then redried. The samples of SAP treated with 0.135 M, 0.067 M and 0.033 M KCl were found to contain 0.73%, 0.45% and 0.21% potassium ion by weight, respectively. Five gram samples of each treated SAP were subjected to humidification at 75% R.H. and 35° C. and the results are shown in Table I, wherein it may be seen that hygroscopicity increased with decreasing potassium ion and vice versa.

TABLE I

*Humidification tests at 75% R.H. and 35° C.*

[SAP treated with varying percentages of KCl solutions]

| Total time of humidification, hours | SAP treated with 0.25% KCl solution (0.033 mole KCl in 100 ml. solvent), percent weight gain | SAP treated with 0.5% KCl solution (0.067 mole KCl in 100 ml. solvent), percent weight gain | SAP treated with 1.0% KCl solution (0.135 mole KCl in 100 ml. solvent), percent weight gain |
|---|---|---|---|
| 10 | 2.8 | 0.7 | 0.4 |
| 25 | 6.2 | 1.6 | 0.8 |
| 50 | 11.6 | 2.8 | 1.4 |
| 75 | 15.8 | 4.0 | 1.8 |
| 95 | 17.4 | 4.5 | 1.9 |

EXAMPLE 6

Two samples of SAP, each weighing 30 grams, were treated according to the procedure described in Example 1, with 0.0135 M KCl in 50% water–50% ethanol solutions. This experiment was carried out to determine whether the degree of hygroscopicity change is dependent upon concentration of the potassium ion (as might be suspected from the results of Example 5, supra) or, in the alternative, upon the amount of potassium ion available for a given weight of SAP. Toward this end, 30 grams of one of the samples was treated in 100 ml. of the 0.0135 M KCl solution and 30 grams of the other in 1000 ml. of the same solution. After drying, the two samples were subjected to identical conditions of humidification at 75% R.H. and 35° C. for 120 hours. The results of this test indicated that the sample treated in 1000 ml. of 0.0135 M KCl solution had a moisture pickup rate approximately the same as the sample treated under the same conditions in Example 5, with 100 ml. of a 0.135 M KCl solution. The sample treated in the present experiment with only 100 ml. of the potassium solution was found to absorb moisture at a much faster rate. The following table shows more specifically the results of the present experiment. For comparison purposes the data for SAP treated in Example 5, with 100 ml. of a 0.135 M KCl solution, is included.

TABLE II

*Humidification tests at 75% R.H. and 35° C.*

(SAP Slurried in Different Volumes of 0.0135 M KCl Solutions)
[50% Water–50% ethanol solvent]

| Total time of humidification, hours | SAP treated with 100 ml. 0.0135 M KCl solution, percent weight gain | SAP treated with 1000 ml. 0.0135 M KCl solution, percent weight gain | SAP treated with 100 ml. 0.135 M KCl solution, (from Example 5), percent weight gain |
|---|---|---|---|
| 10 | 2.8 | 0.4 | 0.4 |
| 30 | 7.8 | 0.9 | 1.0 |
| 60 | 14.5 | 1.6 | 1.6 |
| 90 | 18.8 | 2.1 | 1.6 |
| 120 | 21.8 | 2.3 | 1.9 |

EXAMPLE 7

Five grams (0.0675 mole) of KCl was dissolved in 375 ml. of a 50–50 water-ethanol solution in a 500 ml. flask. After the KCl was completely dissolved additional water-ethanol solution was added to yield a volume of 500 ml. Thirty grams of sodium aluminum phosphate was then slurried for one minute in the KCl solution. After treatment the sample was filtered out of the solution, dried with the aid of vacuum, and pulverized in a jet Micronizer. A second treatment was then accomplished. The pulverized sample was again slurried in 500 ml. of solution containing five grams of KCl. Subsequent to second treatment the sample was separated and thoroughly dried. Analysis of the dried sample showed the presence of 6.3% potassium. Five grams of the twice-treated sample, during controlled humidification at 75% R.H. and 35° C. for 144 hours, increased in weight by less than 5.0%.

EXAMPLE 8

To 3850 gallons of 80% orthophosphoric acid ($H_3PO_4$) were added 3300 pounds of soda ash and 77 gallons of a 45% KOH solution. The charge temperature was observed to rise from 30° C. to 70° C. whereafter the reaction mixture was observed to contain 3.53% $Na_2O$. A portion of the reaction mixture, 1020 gallons, was then heated to 95° C. over a three hour period and then 3120 pounds of hydrated alumina was added over an additional three hours. The charge was then agitated for one hour and analyzed. The $P_2O_5$:$Al_2O_3$ ratio was found to be 3.76. This charge was held at 100° C. for 6.5 hours and then cooled to 70° C. over a 4 hour period. The cooled charge was then held with agitation at 70° C. while feeding intermittently for 168 hours to a jacketed kneader-conveyor. The jacket of the kneader-conveyor was supplied with steam at a pressure of 78 p.s.i. while the blade rotation was 18.3 r.p.m. The production rate over the entire run ranged between 350 and 475 pounds of product per hour. The product was found to be non-hygroscopic according to the definition contained herein above.

The potassium-treated SAP products of the present invention were tested to determine their qualities as baking acids. Table III, which follows, shows a comparison of reactivity or reaction rate between treated and untreated SAP. The KCl-treated SAP was prepared by slurrying 100 grams SAP for one minute in 300 ml. of a 50% water–50% alcohol solution containing 9 grams of solubilized KCl, and then separating and drying the product as in Example I.

TABLE III

*Doughnut rate of reaction*

| Sample | 2 minute reaction rate, cc. of $CO_2$ liberated | 15 minute reaction rate, cc. of $CO_2$ liberated |
|---|---|---|
| Untreated SAP | 56 | 87 |
| KCl-treated SAP | 55 | 86 |

The doughnut reaction rate test is a standard analytical method used for reactivity studies of baking acids. The test procedure involves reacting the acid with sodium bicarbonate while the reactants are suspended in a moist doughnut dough at a temperature of 27° C.±0.5° C. The proportions of acid and bicarbonate employed are those which are capable of theoretically liberating 200 cc. of $CO_2$ gas. In Table III, the test results are expressed as cc. of gas liberated within the first two and first fifteen minutes after reaction commences. Both treated and untreated samples shown in the table demonstrated typical SAP rates of $CO_2$ evolution. A comprehensive discussion of reaction rate testing, with particular emphasis on the doughnut rate of reaction, may be found in Cereal Chemistry, vol. 8, American Association of Cereal Chemists, St. Paul, Minn., 1931, pp. 423–33.

Baking response was determined by adding a leavening proportion of KCl-treated SAP to a standard biscuit dough formulation and baking the same under controlled conditions. The treated SAP used for the biscuit test was the same as that used for the doughnut rate of reaction test. Water and milk were used as the dough-forming liquids. Results of the biscuit bake test are presented in the following table.

TABLE IV

*Biscuit bake test*

| | Spec. vol. biscuits | Biscuit height, inches | pH |
|---|---|---|---|
| Water Dough: | | | |
| KCl-treated SAP | 2.58 | 9.50 | 7.53 |
| Untreated SAP | 2.55 | 9.25 | 7.47 |
| Milk Dough: | | | |
| KCl-treated SAP | 2.68 | 10.00 | 7.42 |
| Untreated SAP | 2.61 | 9.50 | 7.31 |

Biscuits prepared with treated SAP were found indistinguishable by any of the standard baking criteria from biscuits prepared from control samples containing untreated SAP. In the bake tests reported in Table IV each dough was prepared from the same quantity of ingredients and baked under identical conditions. The doughs prepared with water were baked for fifteen minutes at 475° C. while those prepared with milk were baked twelve minutes at 475° C. Biscuit bake tests and evaluation of the results therefrom is explained in Cereal Laboratory Methods, 6th ed., American Association of Cereal Chemists, 1957, pp. 46–48.

Pancake and cake mixes were prepared using KCl-treated and untreated SAP as the leavening acids. The batters were baked in the usual manner; cakes were baked in an oven at 350° F. for 30–35 minutes and the pancakes were fried on a griddle at about 450° F. until golden brown. A summary of the observations and quantitative data resulting from the bake tests are presented in the following table.

TABLE V
Bake test

|  | Batter, specific gravity | Cake, specific volume | Cake, pH |
|---|---|---|---|
| Cake mix: | | | |
| KCl-treated SAP | 0.77 | 3.09 | 7.49 |
| Untreated SAP | 0.77 | 3.14 | 7.43 |

|  | Batter, initial viscosity | Batter, viscosity after 1 hr. | Pancake appearance | Pancake taste quality |
|---|---|---|---|---|
| Pancake mix: | | | | |
| KCl-treated SAP | 1,440 | 2,240 | Good | Tender, light. |
| Untreated SAP | 1,120 | 2,080 | ___do___ | Do. |

Batter viscosities shown in the above table were obtained using a Brookfield viscometer with a TA spindle rotated at 5 r.p.m. and are reported in centipoises.

The cake mix of Table V was compounded according to the following formula:

| | Percent by weight |
|---|---|
| Cake flour | 37.6 |
| Milled sugar | 42.4 |
| Non-fat dry milk | 3.0 |
| Salt | 0.63 |
| Soda, gr. | 0.79 |
| Gelatinized wheat starch | 2.0 |
| Corn sugar | 1.4 |
| Leavening acid | 0.98 |
| GLP shortening with lecithin | 11.0 |

In compounding the above dry mix, the shortening was blended into the sifted dry ingredients in a mixer. The dry mix was then utilized in the preparation of cakes. An oven was preheated to 350° F. Baking pans were greased and sprinkled with flour. The mix was placed in a bowl to which was added 1¼ cups of water and two egg whites. After mixing the ingredients for four minutes, the batter was poured into the pans and baked for 30-35 minutes.

The GLP shortening of the above formula is well-known in the art and is manufactured by combining with the usual mono- and diglyceride one or more molecules of lactic acid. Similar highly emulsified shortenings are also produced by adding propylene glycol to various well-known shortenings. See for example, Cereals as Food and Feed, S.A. Matz (Avi 1959), p. 346 et seq.

The pancake mix of Table V contained the following ingredients in the proportions indicated:

| | Percent by weight |
|---|---|
| Hardwheat flour, bleached | 23.0 |
| Softwheat flour, bleached | 34.0 |
| Corn flour | 25.0 |
| Rye flour | 4.0 |
| Wheat starch | 3.8 |
| Salt | 3.0 |
| Corn sugar | 3.0 |
| Soda | 2.0 |
| Leavening acid | 2.2 |

Package directions for the above mix usually call for the addition of one egg, ¾ cup milk, and one tablespoon of shortening for each cup of the mix. The eggs, milk and oil (or melted shortening) are mixed with the dry ingredients until an almost smooth batter results. Baking is accomplished on a hot griddle, turning the pancakes only once. The preceding baking procedure was followed in the pancake tests of Table V.

The non-hygroscopic nature of the postassium-modified leavening acid of the invention make it especially well suited for inclusion in prepared cake and pancake mixes. These mixes are compounded dry and usually packaged in commercial containers suitable for sale directly to the consumer. A few final and simple steps of preparation are accomplished by the consumer in the home. Often thirty to sixty days or more elapse between the time the mixes are compounded and the packaged goods appear for sale on the grocery shelf. Mixes containing the leavening agents of the invention demonstrate greater resistance to degradation during prolonged storage (compared to mixes containing untreated SAP), while retaining all of the taste benefits of mixes containing regular sodium aluminum phosphate leavening acid. The "standard" prepared cake and pancake mixes which may be used by our method are those currently in commercial use, as typified by the above cake and pancake formulas, or containing equivalent substituents for the individual ingredients. The prepared cake and pancake mixes set forth in Cereals as Food and Feed, Op. cit., pp. 321-367, which are essentially those in commercial use, are also suitable for inclusion of the treated SAP leavening acids of the invention.

The foregoing description has been given for clearness of understanding only, and no unnecessary limitations should be derived therefrom, as various modifications will be obvious to one skilled in the art.

What we claim is:

1. As a baking acid, a non-hygroscopic potassium modified sodium aluminum phosphate comprising sodium aluminum phosphate to which is chemically bonded at least about 0.1% and not more than about 10.0% potassium, based on the total weight of the potassium modified sodium aluminum phosphate.

2. The non-hygroscopic potassium modified sodium aluminum phosphate baking acid set forth in claim 1 wherein the chemically bonded potassium is present in proportions of at least about 0.1% and not more than about 2.0% by weight.

3. The non-hygroscopic potassium modified sodium aluminum phosphate baking acid set forth in claim 1 wherein the chemically bonded potassium is present in proportions of at least about 0.3% and not more than about 1.0% by weight and the neutralizing value is between 96 and 103.

4. A non-hygroscopic acid-reacting composition comprising an intimate mixture of sodium aluminum phosphate and from about 0.5% to about 20.0% ionizable potassium compound, based on the total weight of the acid-reacting composition.

5. The non-hygroscopic acid-reacting composition of claim 4 wherein the ionizable potassium compound is present in proportions of between about 0.5% and about 4.0%.

6. A non-hygroscopic acid-reacting composition comprising an intimate mixture of sodium aluminum phosphate and from 0.5% to 4.0% of potassium sulfate, based on the total weight of the acid-reacting composition.

7. A non-hygroscopic acid-reacting composition comprising an intimate mixture of sodium aluminum phosphate and from 0.5% to 4.0% of potassium hydroxide, based on the total weight of the acid-reacting composition.

8. A non-hygroscopic acid-reacting composition comprising an intimate mixture of sodium aluminum phosphate and from 0.5% to 4.0% of monobasic potassium phosphate, based on the total weight of the acid-reacting composition.

9. In the method of manufacturing sodium aluminum phosphate by adding reactive sodium and aluminum compounds to a solution of phosphoric acid, the sodium and aluminum compounds being in stoichiometric proportions to provide one sodium atom for each three aluminum atoms and the phosphoric acid in said solution being present in at least an amount sufficient to react with all of said sodium and aluminum compounds, and concentrating the resulting solution to cause crystallization of said sodium aluminum phosphate, the improvement which comprises adding a sufficient amount of an ionizable potassium compound before crystallization to yield upon crystallization a non-hygroscopic potassium modified sodium aluminum phosphate comprising from about 0.1% to about 10% by weight of chemically bonded potassium.

10. The method set forth in claim 9 wherein the chemically bonded potassium is present in proportions of at least about 0.3% and not more than about 1.0% by weight and the resulting potassium modified sodium aluminum phosphate has a neutralizing value between 96 and 103.

References Cited by the Examiner

UNITED STATES PATENTS

| | | | |
|---|---|---|---|
| 1,117,011 | 11/14 | Estabrook et al. | 99—94 |
| 2,550,490 | 4/51 | McDonald | 23—107 |
| 2,774,672 | 12/56 | Griffith | 23—106 X |
| 2,874,051 | 2/59 | Bedink et al. | 99—94 |
| 2,924,509 | 2/60 | Huber et al. | 23—105 |
| 2,957,750 | 10/60 | Knox et al. | 23—105 |

OTHER REFERENCES

Van Wazer, "Phosphorus and Its Compounds," vol. II, Interscience Pub., Inc., New York, 1961, pp. 1604–1608.

A. LOUIS MONACELL, *Primary Examiner.*